United States Patent

[11] 3,611,862

| [72] | Inventor | Richard A. Walker<br>Warrington, Pa. |
|---|---|---|
| [21] | Appl. No. | 871,450 |
| [22] | Filed | Oct. 6, 1969 |
| [45] | Patented | Oct. 12, 1971 |
| [73] | Assignee | Standard Pressed Steel Co.<br>Jenkintown, Pa.<br>Continuation-in-part of application Ser. No. 692,141, Dec. 20, 1967, now abandoned. |

[54] BOLT AND METHOD OF MAKING SAME
13 Claims, 4 Drawing Figs.

[52] U.S. Cl. ..................... 85/9 R, 10/27 R
[51] Int. Cl. ..................... B21k 1/44, F16b 23/00, F16b 35/00
[50] Field of Search ........................... 85/9 R, 9 W, 1 R, 45, 32 R, 1.5; 10/27 R, 10 R; 151/69, 68

[56] References Cited
UNITED STATES PATENTS

| 455,347 | 7/1891 | Morrison | 85/1 R UX |
|---|---|---|---|
| 1,139,479 | 5/1915 | Brightman | 85/9 R UX |
| 1,742,201 | 1/1930 | Drissner | 85/9 R |
| 1,836,384 | 12/1931 | Mohr | 10/27 R |
| 2,237,236 | 4/1941 | Matthews | 85/9 R |
| 2,395,377 | 2/1946 | MacLean | 85/9 R |
| 2,895,368 | 7/1959 | Place | 85/1 R |
| 2,985,898 | 5/1961 | Goude | 10/27 R |
| 3,298,725 | 1/1967 | Boteler | 85/1 R X |

*Primary Examiner*—Ramon S. Britts
*Attorney*—Andrew L. Ney

ABSTRACT: A bolt formed by turning a nut onto an externally threaded section of a stud which is spaced from an end of the stud by an abutment shoulder. The nut is turned onto the stud so that one end face of the nut bears against the abutment shoulder.

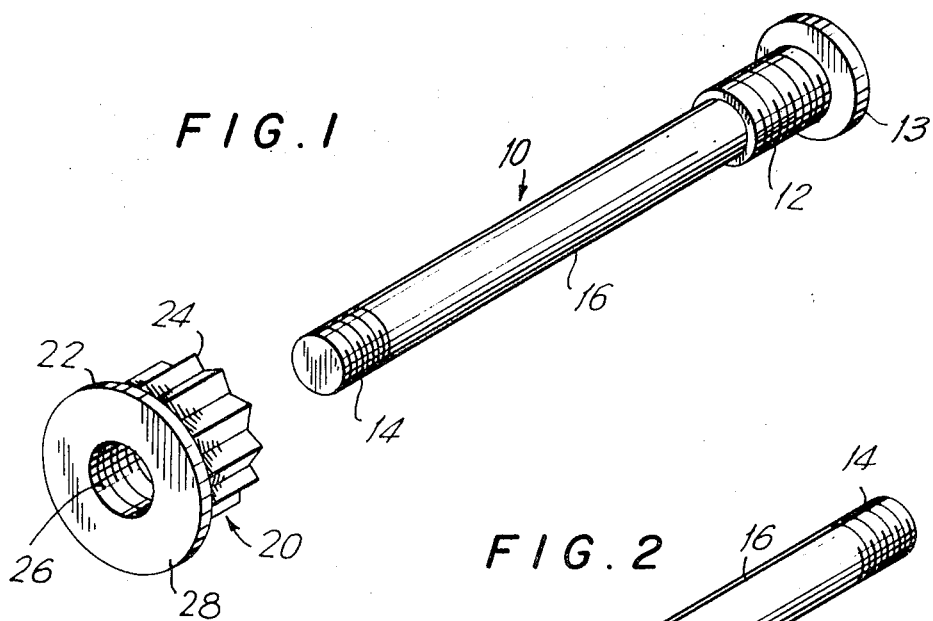
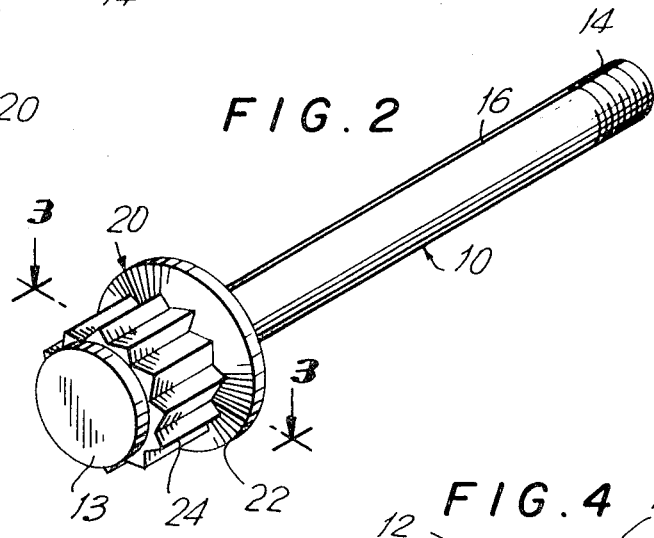
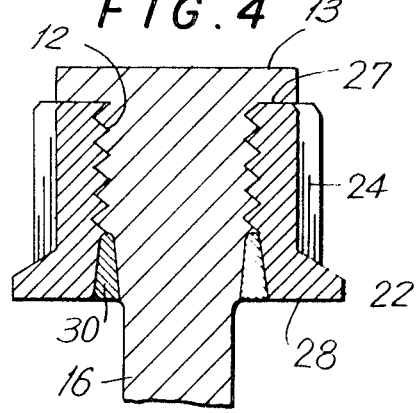
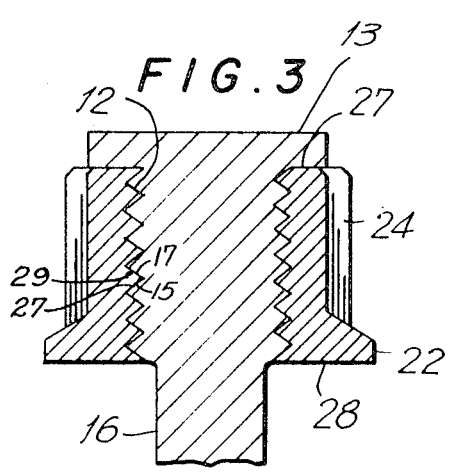

BOLT AND METHOD OF MAKING SAME

This application is a continuation-in-part of my copending application Ser. No. 692,141 now abandoned.

The present invention relates, in general, to fasteners and, in particular, to the fabrication of high-strength bolts especially useful in aircraft, missile and space applications.

Because of the severe requirements of the high-speed, heavier aircraft presently in use or being developed, much time and effort is being devoted to the development of new fastening devices and materials from which these devices may be fabricated. The high-temperature ranges, sonic vibration levels and loads to which these aircraft are subjected has resulted in the use of such high-strength materials as A286 Stainless Steel, Waspalloy, 300 series Stainless Steels, alloy steels and other similar alloys in the fabrication of fasteners for these aircraft.

A characteristic of these alloys is that their strength is increased significantly if they are subjected to a combination of mechanical working and heat treatment or mechanical working alone. Mechanical working as used herein involves the plastic deformation of a material as, for example, by a reduction in cross-sectional area through extrusion, drawing or rolling. Typical of the results achieved at the present time are ½-inch to ⅝-inch bolts having tensile strengths in excess of 200,000 p.s.i.

Generally, the fabrication of these mechanically worked bolts by conventional techniques is limited by the size of presently available forging equipment and by various handling and process control difficulties. For example, as these alloys are mechanically worked, they harden and it becomes more difficult to continue the mechanical working to complete the formation of configuration details such as wrenching surfaces. This adds to the size and power requirements of the equipment to be employed. In addition, the dies used to form the bolts must be able to withstand the extremely high forces developed during the bolt-forming operation. In other cases, in order to achieve the desired results of mechanical working some of these alloys are mechanically worked while they are in a condition which, from the fabrication standpoint, is not conducive to the formation of configuration details. Various problems in handling the material and controlling the processing are encountered. As a result, presently available equipment and techniques generally do not permit efficient and practical fabrication of bolts from these mechanically worked alloys.

Accordingly, it is an object of the present invention to provide new and improved high-strength bolts which may be fabricated in an efficient and practical manner from alloys which develop high-strength properties either by the combination of mechanical working and heat treatment or by mechanical working alone.

It is another object of the present invention to provide a method of fabricating high-strength bolts from these alloys through the use of conventional, presently available bolt-making equipment.

These objects, as well as others, are achieved according to a preferred embodiment of the present invention by providing a stud made of a mechanically worked alloy and having an externally threaded section spaced from one end of the stud by an abutment shoulder. A nut is turned onto said externally threaded section with one end face of the nut bearing against the abutment shoulder. As used herein, a "mechanically worked alloy" refers to that class of alloys which develop high-strength properties either by the combination of mechanical working and heat treatment or by mechanical working alone.

For a better understanding of the present invention, together with other and further objects thereof, reference is made to the following description, taken in connection with the accompanying drawing, and its scope will be pointed out in the appended claims. Referring to the drawing:

FIG. 1 is an exploded perspective view of the component parts of a bolt constructed in accordance with the present invention prior to their assembly;

FIG. 2 is a perspective view of a bolt constructed in accordance with the present invention;

FIG. 3 is a sectional view taken along line 3—3 of FIG. 2; and

FIG. 4 is a sectional view showing a modification to the bolt illustrated in FIGS. 2 and 3.

Referring to the drawing, a bolt constructed in accordance with the present invention includes a stud 10 and a nut 20. Stud 10 is provided with an externally threaded section 12 and an abutment shoulder 13 at one end of the stud. A second externally threaded section 14 is provided at the other end of the stud and is spaced from threaded section 12 by unthreaded shank section 16. As most clearly illustrated in FIG. 1, the diameter of threaded section 14 is less than the diameter of threaded section 12.

Nut 20 is composed of a flange section 22 and a splined section 24. The bore 26 of nut 20 extends from upper end face 27 of nut 20 to lower end face 28 and is threaded so that it may be turned onto threaded section 12 of stud 10.

Stud 10 and nut 20 are made of a mechanically worked alloy such as A286 Stainless Steel. Each of these parts is mechanically worked by conventional equipment to the general configuration illustrated except for the thread rolling operations. After mechanical working, stud 10 and nut 20 are heat-treated. A typical heat-treating temperature range for A286 Stainless Steel is 1,200°–1,400° F. Such temperatures do not destroy the effects of mechanical working. After heat treatment, the threads of sections 12 and 14 are rolled on stud 10 and bore 26 of nut 20 is tapped or internally thread rolled. The rolling operations provide further mechanical working of the components.

The bolt illustrated in FIG. 2 is assembled by passing nut 20 over threaded section 14 and up along shank 16 to threaded section 12 where it is turned into threaded engagement with the last-mentioned threaded section until upper end face 27 of the nut bears against the lower surface of shoulder 13. Since the nut is in threaded engagement with the stud, means must be provided to rigidly secure the nut to the stud and prevent relative rotation therebetween as the bolt is torqued into or out of a mating piece. Various such means will be described hereinafter by way of example.

As one example of means rigidly securing the bolt assembly, the nut 20 is turned onto threaded section 12 with a torque sufficient to jam the nut against shoulder 13, thereby preloading the interface between upper end face 27 of the nut and the lower surface of shoulder 13. By preloading the interface, an additional force is added to the normal friction force along the threaded engagement between the nut and the stud and also at the interface which resists relative rotation between the nut and the stud. In addition, upper end face 27 of nut 20 or the lower surface of shoulder 13 or both may be knurled or roughened to increase the friction between these surfaces.

While the above-described means is sufficient for some applications of the bolt assembly, it will not provide sufficient resistive force in other applications and other means can be utilized. For example, threads 12 and 14 on the stud are oriented so that as the bolt assembly is torqued into its mating piece, the nut, if not resisted, tends to turn off the stud. However, as the bolt is torqued into the mating piece, the stud elongates, thereby providing an additional force between the stud and the nut since the bolt cannot fit through its associated aperture. If the threads are of conventional design, this additional or elongation force will be effective at the interface between the nut and the shoulder and added to the friction force caused by the previously described preloading means. Thus, resistance to rotation is increased. Moreover, this resistance increases with the torque applied to the nut because as the bolt is tightened, the stud further elongates and, accordingly, more elongation force is operative at the interface.

As pointed out above, the elongation force is transmitted to the interface if the thread design is conventional. This is because in conventional thread design there is a clearance between the nut thread and the stud thread and, in the embodiments described above, the upper flank of nut thread 26 does not engage the lower flank of stud thread 12. Accordingly, as the stud elongates, thread 12 is pulled downwardly out of engagement with thread 26 and the force is operative solely at the interface. As the elongation and its resulting force becomes sufficiently high, there is a danger that head 13 will crack.

In order to prevent cracking at the head, the means rigidly securing the nut to the stud can include matching the pitch diameters of threads 12 and 26 so that clearance between the threads is minimal. Referring to FIG. 3, when the pitch diameters are matched, both flanks 27 and 29 of the nut thread engage both flanks 15 and 17, respectively, of the stud thread. Thus, as the stud elongates, flank 15 of the stud thread bears against flank 27 of the nut thread and the elongation force is, therefore, distributed along the threads and at the interface.

As another example of means for preventing rotation between the nut and the stud, reference is made to FIG. 4 of the drawing wherein a weld seam 30 is shown along a selected length of the threaded engagement between stud 10 and nut 20. While various methods of welding can be used, electron beam welding is preferred.

In order to permit the bolt illustrated in FIG. 2 to be torqued by a socket wrench, the diameter of shoulder 13 is no greater than the minor diameter of splined section 24, namely, the distance from one root of splined section 24 to a diagonally opposite root. Alternatively, the periphery of shoulder 13 may be splined and have the same cross-sectional dimensions as splined section 24 of nut 20. This however, adds to the complexity of forming stud 10 and also requires that the stud and nut 20 be arranged so that the splined shoulder is in alignment with splined section 24.

Although in the embodiment of the invention described above both parts of the bolt are made of the same mechanically worked alloy, two different compatible alloys may be employed in practice. In addition, in certain instances it will be sufficient to fabricate only the stud from a mechanically worked alloy. Again, the material chosen for the nut should be compatible with the stud material. The choice of materials is dependent upon the application.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A bolt comprising
a stud fabricated from a mechanically worked alloy and having first and second externally threaded sections separated by an unthreaded section, said first threaded section spaced from one end of said stud by a radially extending abutment shoulder, and said second threaded section having major and minor diameters less than those of said first threaded section;
an internally threaded element threadedly engaging said first externally threaded section of said stud, one end of said element bearing against said abutment shoulder;
and means rigidly securing said internally threaded element to said stud.

2. A bolt according to claim 1 wherein the maximum cross-sectional dimension of said shoulder is no greater than the minimum diametral distance from one point on the periphery of said internally threaded element to another point on said periphery.

3. A bolt comprising
a stud fabricated from a mechanically worked alloy and having first and second externally threaded sections separated by an unthreaded section, said first threaded section spaced from one end of said stud by a radially extending abutment shoulder and said second threaded section having a maximum diameter less than the minimum diameter of said first threaded section;
an internally threaded element threadedly engaging said first externally threaded section of said stud, one end of said element bearing against said abutment shoulder;
and means rigidly securing said internally threaded element to said stud.

4. A bolt comprising:
a stud fabricated from a mechanically worked alloy and having first and second externally threaded sections separated by an unthreaded section, said first threaded section spaced from the adjacent end of said stud by a radially extending abutment shoulder;
an internally threaded element threadedly engaging said first externally threaded section of said stud, one end of said element bearing against said shoulder;
and means rigidly securing said internally threaded element to said stud.

5. A bolt according to claim 4 wherein the means rigidly securing said internally threaded element to said stud comprises said one end of said internally threaded element being jammed against said abutment shoulder, whereby a force is operative between said internally threaded element and said stud.

6. A bolt according to claim 4 wherein the means rigidly securing said internally threaded element to said stud comprises an elongation of the stud, whereby a force is operative between said internally threaded element and said stud.

7. A bolt according to claim 4 wherein the means rigidly securing said internally threaded element to said stud comprises a thread arrangement wherein both flanks of the thread on said internally threaded member bear against both flanks of said thread on the stud.

8. A bolt according to claim 4 wherein the means preventing rotation comprises a weld seam along a selected length of the threaded engagement between the internally threaded member and the stud.

9. A method of making headed male fasteners comprising:
providing a stud fabricated from a mechanically worked alloy and having first and second externally threaded sections separated by an unthreaded section, said first threaded section spaced from one end of said stud by an abutment shoulder and said second threaded section having a maximum diameter less than the minimum diameter of said first threaded section;
providing a nut adapted for threaded engagement with said first threaded section of said stud;
passing said nut over said second threaded section of said stud and along said unthreaded section of said stud to said first threaded section of said stud;
turning said nut onto said first threaded section of said stud for said threaded engagement so that one end face of said nut bears against said shoulder of said stud and the second end face of said nut is closer to the runout of said first externally threaded section than to second externally threaded section;
and rigidly securing said nut to said stud.

10. A method of making headed male fasteners according to claim 9 wherein the nut is rigidly secured to said stud by jamming said one end face of said nut against said shoulder of said stud.

11. A method of making headed male fasteners according to claim 9 wherein the nut is rigidly secured to said stud by matching the pitch diameters of said nut thread and said second threaded section of said stud.

12. A method of making headed male fasteners according to claim 9 wherein the said nut is rigidly secured to said stud by stretching the stud, thereby creating a force between said nut and said stud.

13. A method of making headed male fasteners comprising:
providing a stud fabricated from a mechanically worked alloy and having first and second externally threaded sections separated by an unthreaded section, said first threaded section spaced from one end of said stud by an abutment shoulder and said second threaded section having a maximum diameter less than the minimum diameter of said first threaded section;

providing a nut adapted for threaded engagement with said first threaded section of said stud;

passing said nut over said second threaded section of said stud and along said unthreaded section of said stud to said first threaded section of said stud;

and turning said nut onto said first threaded section of said stud for said threaded engagement so that one end face of said nut bears against said shoulder of said stud and the second end face of said nut is closer to the runout of said first externally threaded section than to second externally threaded section;

after said nut is turned onto said first threaded section of said stud said nut and said stud are united by electron beam welding along selected mating surfaces of said stud and said nut.